Figure 4:
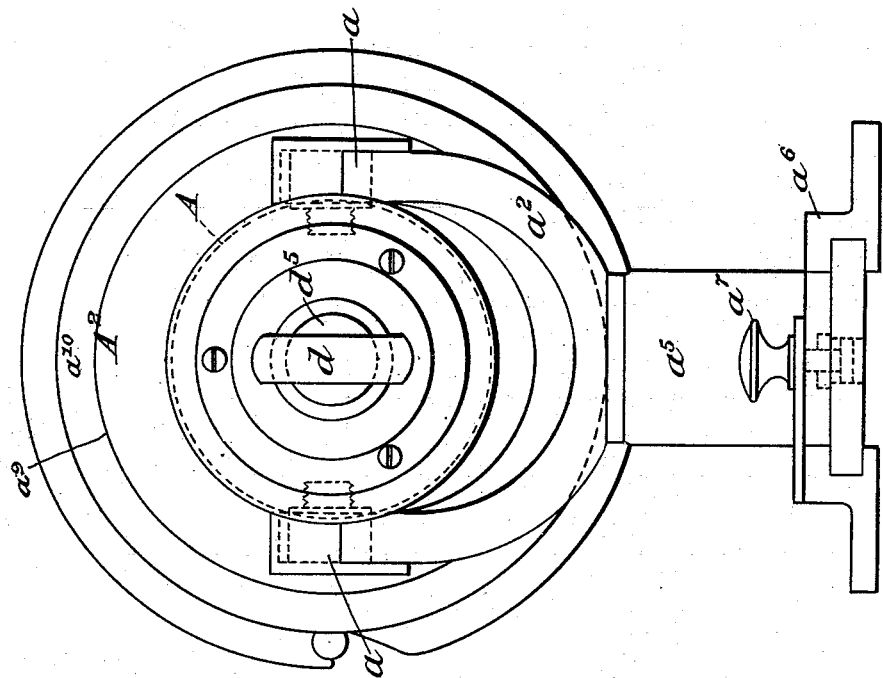

No. 647,776. Patented Apr. 17, 1900.
T. F. & T. S. WALKER.
SHIP'S LOG.
(Application filed June 19, 1899.)
(No Model.) 6 Sheets—Sheet 1.
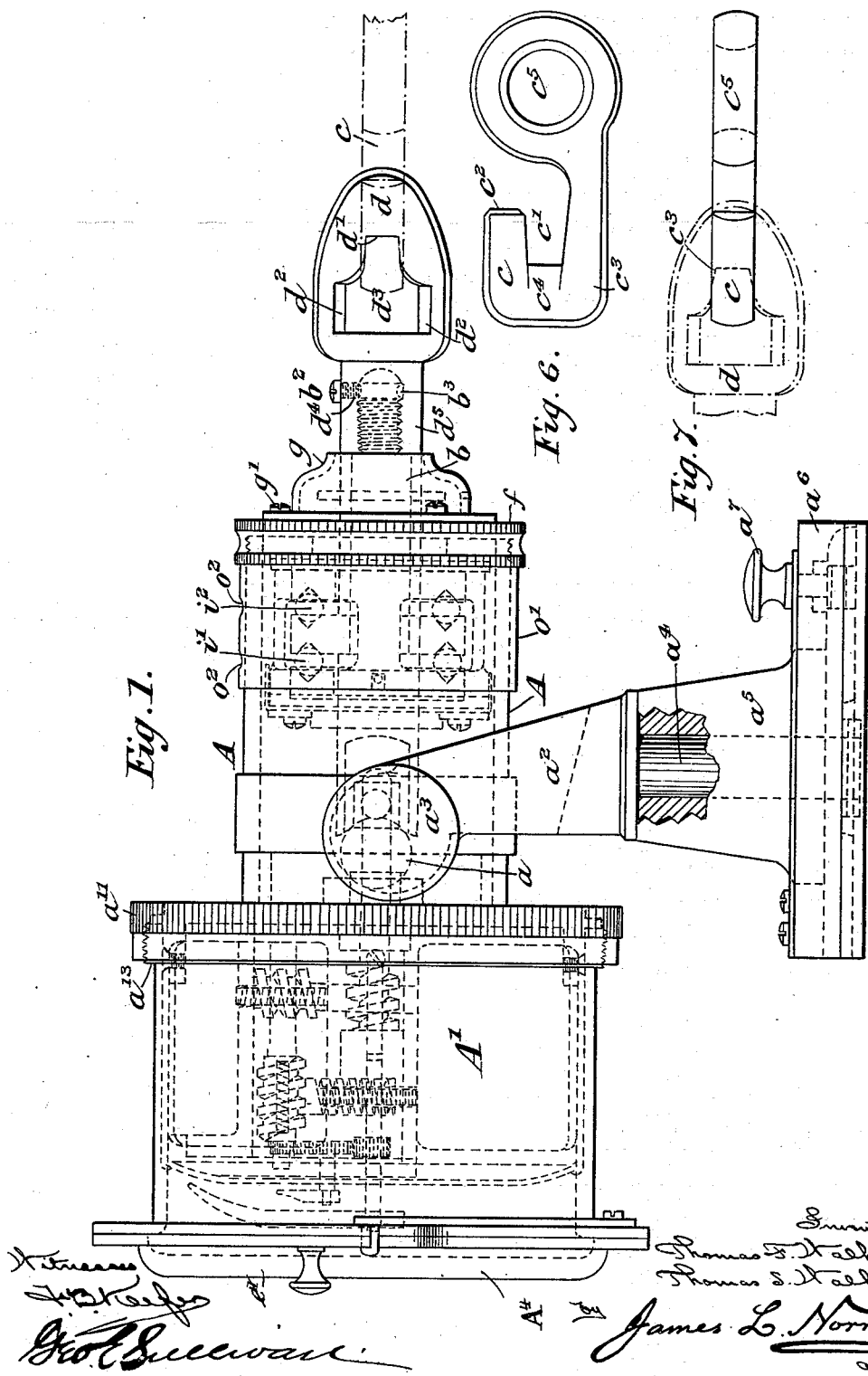

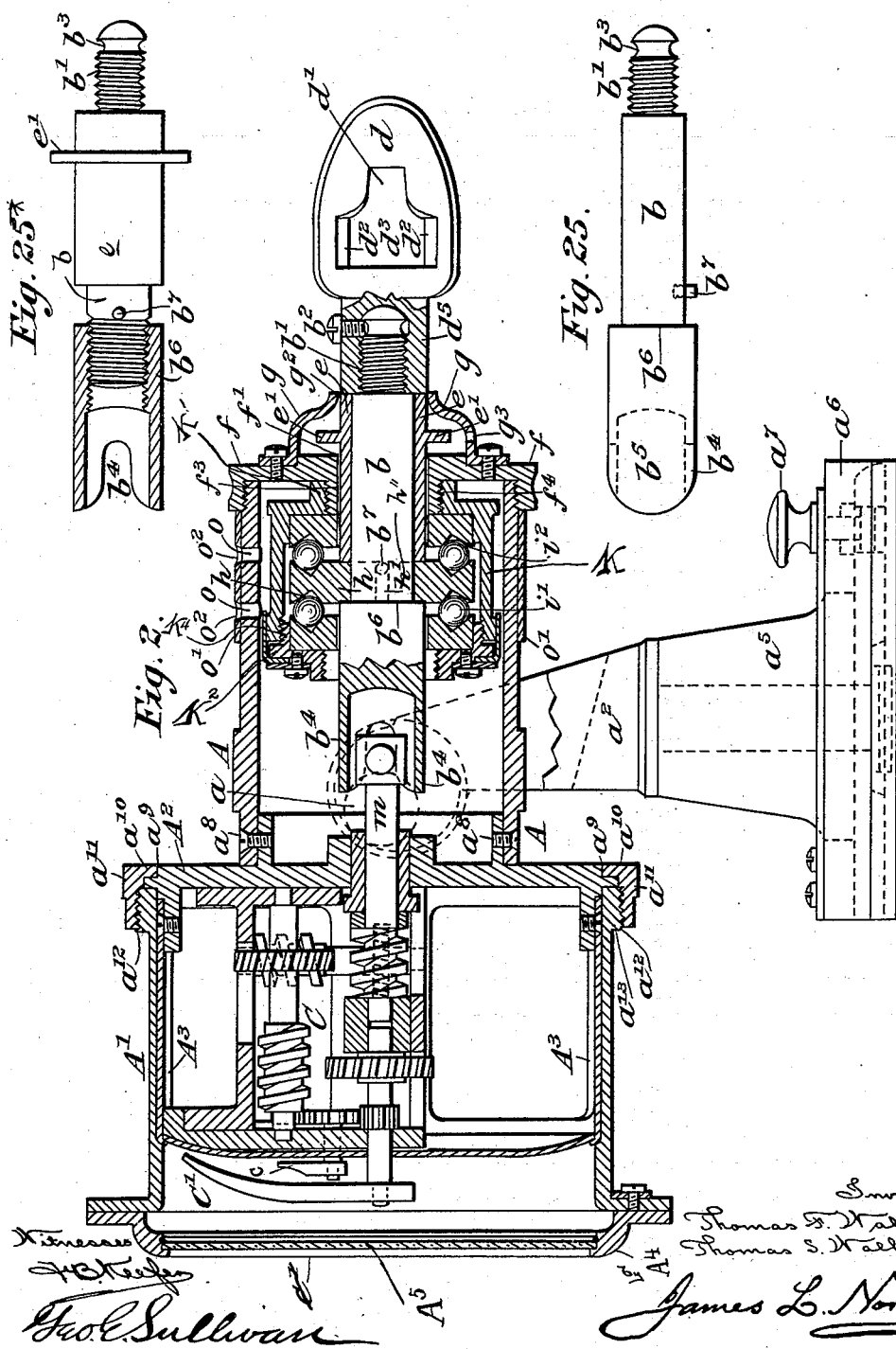

No. 647,776. Patented Apr. 17, 1900.
T. F. & T. S. WALKER.
SHIP'S LOG.
(Application filed June 19, 1899.)
(No Model.) 6 Sheets—Sheet 3.

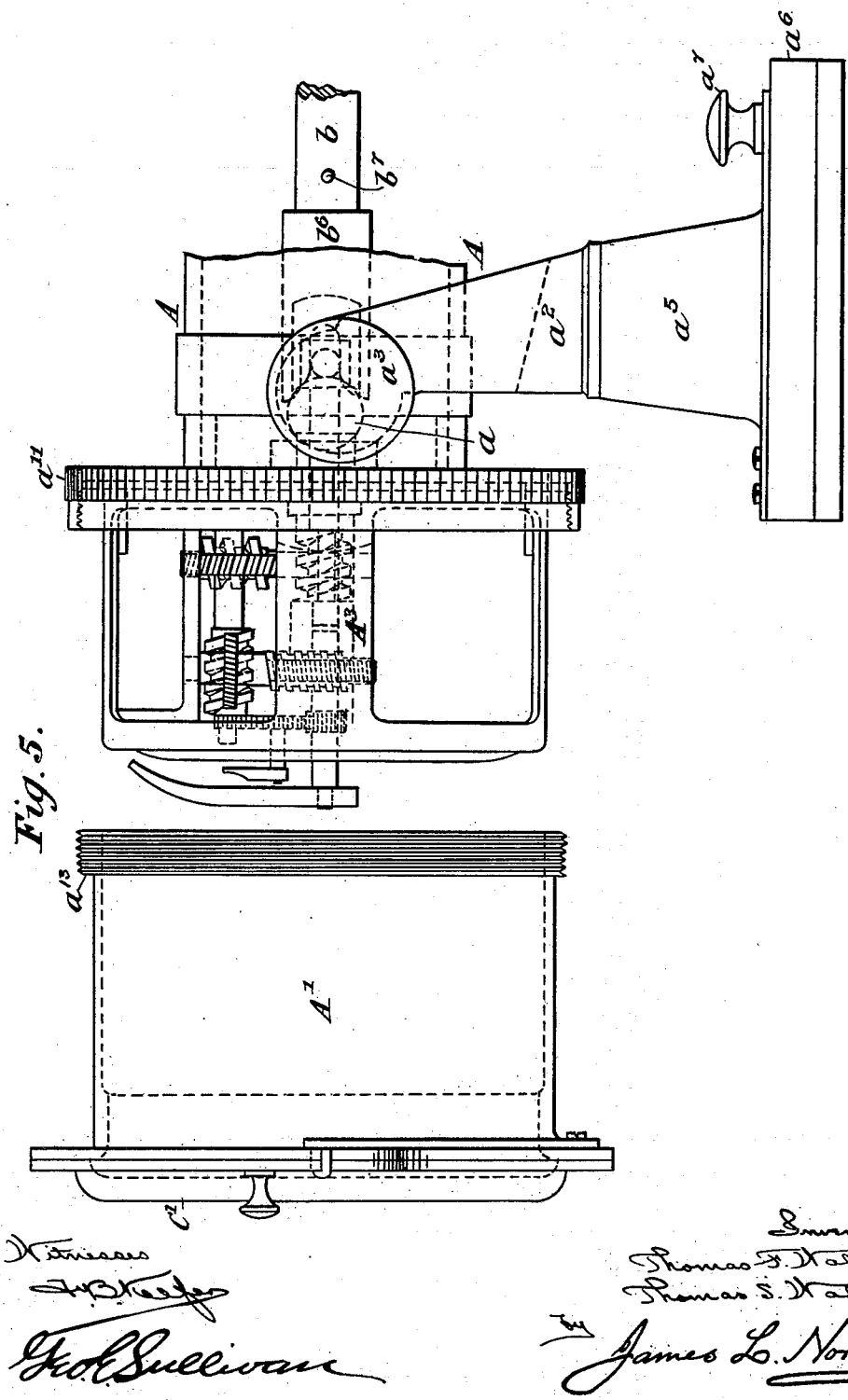

No. 647,776. Patented Apr. 17, 1900.
T. F. & T. S. WALKER.
SHIP'S LOG.
(Application filed June 19, 1899.)
(No Model.) 6 Sheets—Sheet 5.
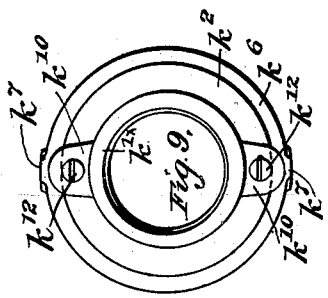
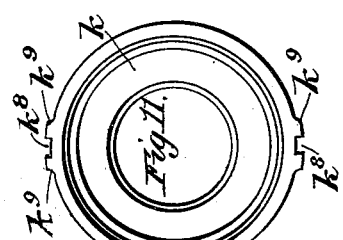
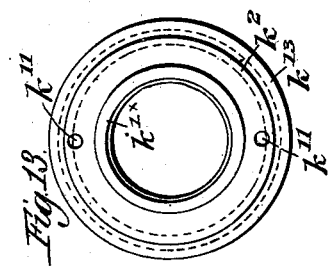
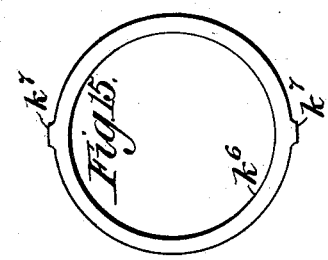
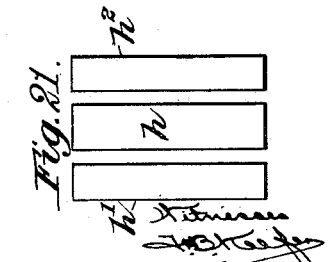
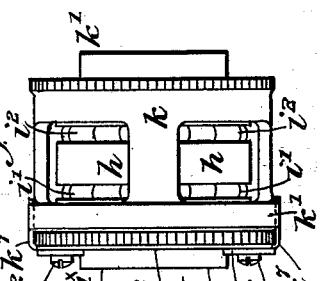
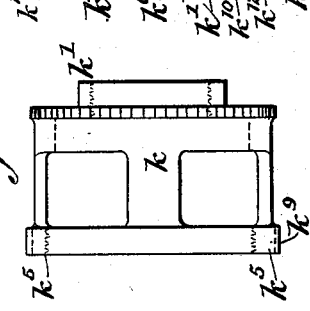
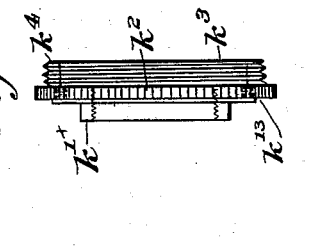
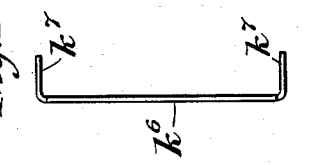
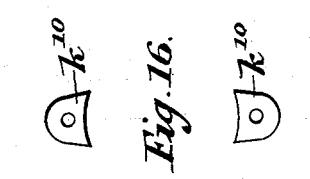
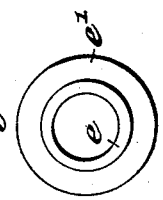
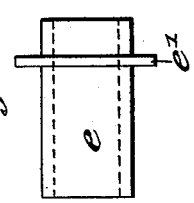
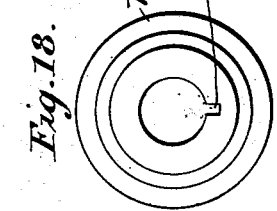
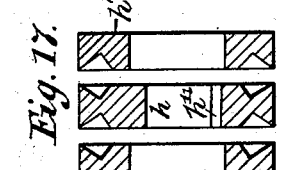
Witnesses
Geo. E. Sullivan
Inventors
Thomas F. Walker
Thomas S. Walker
by James L. Norris
THE NORRIS PETERS CO., PHOTO-LITHO., WASHINGTON, D. C.

No. 647,776. Patented Apr. 17, 1900.
T. F. & T. S. WALKER.
SHIP'S LOG.
(Application filed June 19, 1899.)
(No Model.) 6 Sheets—Sheet 6.

UNITED STATES PATENT OFFICE.

THOMAS FERDINAND WALKER AND THOMAS SYDNEY WALKER, OF BIRMINGHAM, ENGLAND.

SHIP'S LOG.

SPECIFICATION forming part of Letters Patent No. 647,776, dated April 17, 1900.

Application filed June 19, 1899. Serial No. 721,132. (No model.)

*To all whom it may concern:*

Be it known that we, THOMAS FERDINAND WALKER and THOMAS SYDNEY WALKER, subjects of the Queen of Great Britain, residing at Birmingham, in the county of Warwick, England, have invented certain new and useful Improvements in Ship's-Log Apparatus, (for which application has been made in Great Britain numbered 25,088 and dated November 28, 1898,) of which the following is a specification.

This invention relates to ship's-log apparatus of the type in which the "rotator" is in the water and the "register" is on board, as upon the "taffrail." In ship's-log apparatus of this description for use on ships propelled at high rates of speed especially it is necessary to the continuous and correct operation of the mechanism that the greatly-increased frictional strains, causing increased wear and tear, should be provided for and those effects neutralized.

The invention to be herein described relates to the production of a novel ship's-log apparatus by which the operation of the parts of such mechanisms is greatly facilitated and their wear and tear are reduced by the reduction of the friction and strains and by the facility afforded for the application of lubricants without the disturbance of adjustments of co-acting parts.

We have shown our invention embodied in a taffrail-log apparatus, and the description hereinafter is particularly directed to such an embodiment, but any similar form of "inboard" register apparatus for a log will come within the scope of our invention.

By the term "register" we mean that portion of the ship's-log apparatus inward of the towing-line, and by the "rotator" we mean any usual implement towed in the water and so constructed as to rotate in that element under the stress of the friction developed by towage.

In our improved log apparatus the revolutions of the rotator are transmitted to the registering-wheelwork by means of a hook and eye of novel construction adapted to give a secure hold when engaged one with the other by a simple movement and when so engaged to become rigid under normal towing strain, thus preventing wear. This hook and eye are respectively secured to the first spindle of the register and to the inner end of the rotator-line, preferably the hook to the rotator-line and the eye to the register's "first" spindle. This spindle is connected with an antifriction-ball-bearing device, to be hereinafter described, and at the point where the spindle enters the casing of the register provision is made for the exclusion of sea-water, which in practice might dash over such parts and would if it obtained an entry corrode the steel parts. The first spindle of the register when its parts are in working relation engages the end of the main spindle of the register proper or wheelwork for actuating the hands relatively to the graduated dial. These wheelwork and dial parts may be of usual construction in themselves; but our invention embodies a novel mode of mounting them upon the movement-plate as a base to which normally those parts are fixed in the sense of being inseparable in ordinary use, while the cylindrical cover, which also carries the hinged dial-cover parts, is removable sufficiently to permit of ready access to and examination of the wheelwork for such purposes as lubrication or cleaning.

The register mechanism in its inclosing case, with usual trunnions, is mounted in usual gimbals, so constructed as to enable the instrument correctly to aline itself to the line of pull of the rotator connection, and the gimbal parts are usually connected by us to a slide which has a lock and is itself fastened to the taffrail or such convenient part of the vessel as may be selected by screws.

Figure 3:
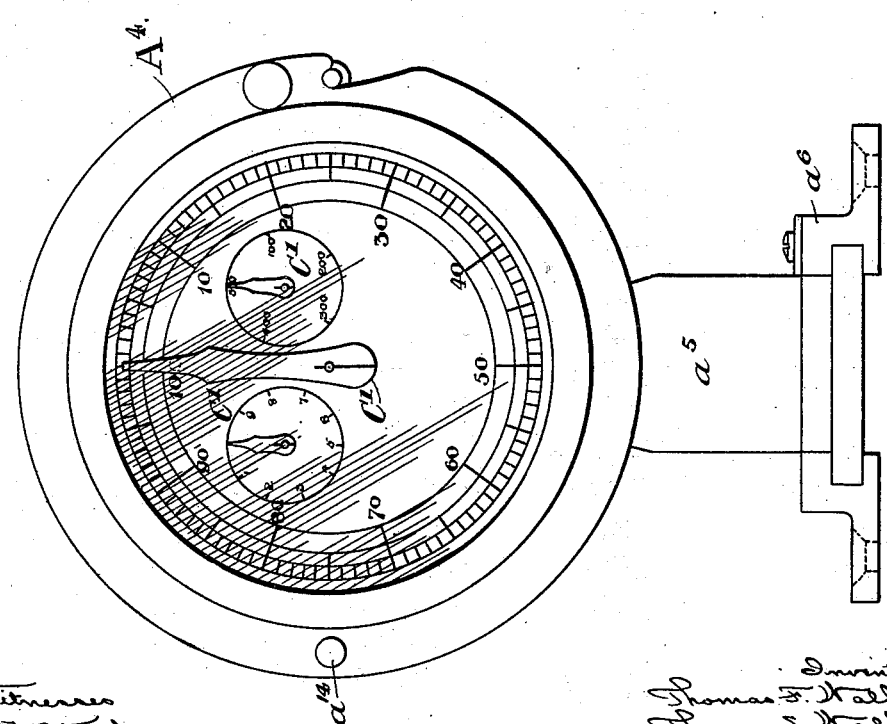
Figure 22:
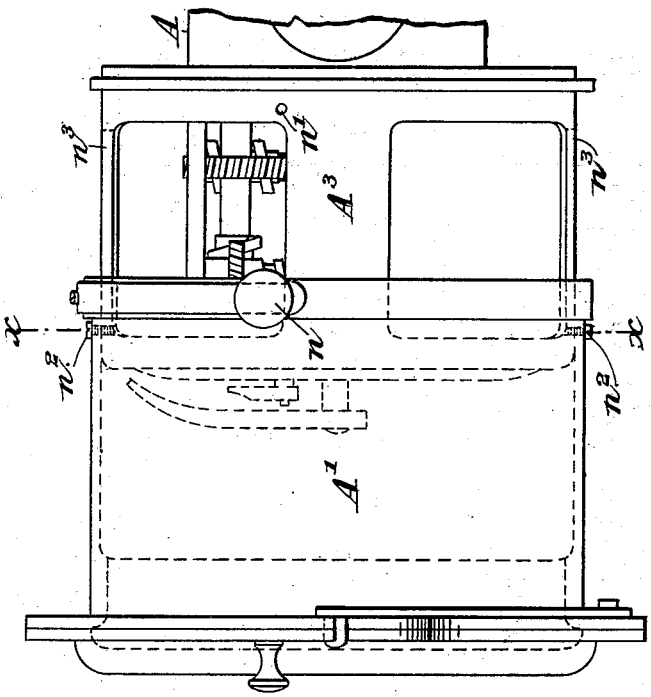
Figure 23:
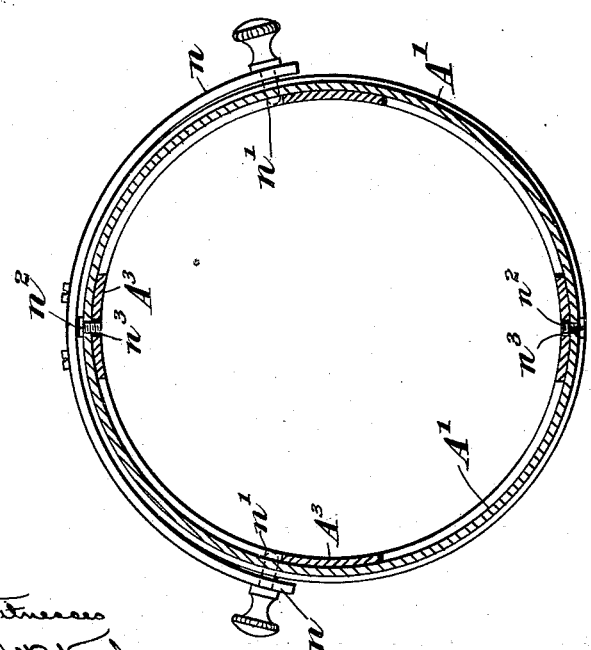

Figure 1 represents by external side view one form of ship's-log-register apparatus entire (with the exception of the towing-line and rotator, which are not shown, as they do not come within the scope of the invention) with our improvement applied. Fig. 2 shows the same parts in section. Fig. 3 shows a front view of the register looking toward the dial-face, and Fig. 4 shows a corresponding external view looking at the back of the "register-casing." Fig. 5 shows an external side view of the front part of the register with the cover to the wheelwork and dial removed to a short distance. Figs. 6 and 7 show by side view and edge view, respectively, the shape of the hook or male portion of the fastener of the tow-line to the "eye" or female portion on the register-spindle. Figs. 8 to 21, inclusive, show the antifriction-ball-bearing device and details of its various parts. Fig. 22 shows a side view; Fig. 23, a sectional view taken on the line $x\,x$ of Fig. 22; and Fig. 24, a detail, being a portion of the casing, showing the slot for the screw $n^2$, attached to the sliding cover, to reciprocate in without the cover becoming entirely separated. Fig. 25 shows the first spindle of the register separately. Fig. $25^\times$ is a view showing a modified construction of the sleeve inclosing the spindle.

In the drawings the barrel or chamber A contains the ball-bearings and carries the trunnions $a$, the wheelwork, and its frame and cover, as well as the spindle $b$.

$a^2$ is the gimbal, in the arms of which, at $a^3$, the said trunnions are journaled. The stem $a^4$, supporting gimbal $a^2$, is socketed in the part $a^5$, which part is slid into the flanged holder $a^6$ and held therein by a lock-pin $a^7$.

The register-case swings vertically on the trunnions $a$ and horizontally on the vertical pin or stem $a^4$ to aline itself to the direction of pull.

The hook $c$ (see Figs. 6 and 7) is formed with an open loop $c^5$, into which is entered and fastened the inward end of the rotator-line. The sides of the hook $c$ are substantially flat, and the recess $c'$ is substantially square, while the parts $c^2$ and $c^3$ are rectangular in cross-section. An incline at $c^4$ is provided to facilitate engagement with its fellow part of the connection. The eye $d$ is also made of somewhat flat form at its sides and has a rectangular recess $d'$ to fit the hook $c$. The parts $d^2$ of the sides of larger opening $d^3$ are made curved to ease the engagement of the hook $c$. This hook $c$ is engaged with the eye $d$ by entering its end $c^2$ into $d^3$ when the hook $c$ is in a position at right angles to Fig. 6 and by a quarter-turn of the hook relatively to the eye in the plane of its entry and then a quarter-turn at right angles to aline the hook and eye to their operative positions, as seen in dotted lines as regards the hook in Figs. 1 and 7. The part $c^4$ of the hook $c$ fits tightly in the correspondingly-shaped part $d'$ of the eye $d$, and the two parts in operation practically work as if one piece, and so any frictional wear is averted.

As more clearly seen in Fig. 2, the stem $d^5$ of the eye $d$ is made hollow and with a screw-thread to engage the corresponding screw-thread $b'$ of the spindle $b$. For further security a screw $b^2$ is passed through a hole $d^4$ in the stem $d^5$, the said hole being threaded to fit the said screw which projects into the annular recess $b^3$ near the end of spindle $b$, serving to lock it.

As shown in Fig. 2, the spindle $b$ is mounted in a sleeve $e$, which has an annular flange $e'$. Said sleeve is entered into the opening $f'$ in the end plate $f$ of the casing and is held in place therein, but without contact with the casing or end plate, the said sleeve being tightly held between the disk $h$ and the screwed socket $d^5$. Around the opening $f'$ and so as to cover the annulus $e'$ is fastened the dome $g$ by screws $g'$ passing into plate $f$. Any water entering between the lip $g^2$ around the outer end of the sleeve $e$ is intercepted by the projection $e'$ and trapped in the annular space within that dome and can trickle away through the small outlet provided therein at $g^3$. The spindle $b$ has a fork $b^4$ formed by two curved side pieces, and hollow chamber in the larger diameter $b^6$. The cleft between the parts of the fork engages end of spindle $m$.

$b^7$ is a projecting pin which serves by engagement in a recess $h''$ in a disk $h$, to be described, to couple the spindle $b$ and the said disk together, so as to insure that they shall rotate in unison.

The antifriction-bearings of the spindle $b$ are constituted as follows: The disk $h$ has an annular raceway on each face. On opposite sides of this disk $h$ are other disks $h'$ and $h^2$, each provided on the side next to $h$ with a circular raceway, and between these races are held the respective sets of balls $i'\,i^2$ in two necklaces. These races, disks, and balls are held in operative connection by a case (more clearly seen in Figs. 10 and 11) composed of circular shell $k$, one end of which is partially open and formed with a flange $k'$, internally threaded to engage the corresponding screw-thread $f^4$ on the circular flange $f^3$ of the end plate $f$, Fig. 2. This shell when in working form is partially closed at its opposite end by the ring or cover $k^2$, said ring having a circular flange $k^4$ (see Figs. 12 and 13) formed on its outer edge with a screw-thread to engage a thread on the inner surface of the shell at its open end $k^5$. (See Fig. 10.) This ring $k^2$ has a flanged opening $k'^\times$, internally threaded the same as the flange $k'$ and so that when the shell and its cover are connected either end of the shell-casing can be reversed and screwed onto the thread of the flange $f^3$, Fig. 2, and thereby reverse the functions of the two sets of balls and races should any greater extent of wear be developed on the one set than on the other. The disks and balls can be adjusted as to the amount of clearance between them by screwing the ring $k^2$ in or out of the shell $k$, and when so adjusted the ring $k^2$ can be locked in that position by the following device: The outer edge of the ring $k^2$ is milled to facilitate handling, and on the edge at $k^{13}$ (see Figs. 12 and 13) is formed an annular rabbeted surface, on which lies snugly a flat annular piece $k^6$, provided with two inwardly-projecting horns $k^7\,k^7$, Figs. 14 and 15, which are adapted to lie in the recesses $k^8\,k^8$, Fig. 11, formed by the projections $k^9$ on the rim of the shell $k$. On the surfaces of the rings $k^2$ and $k^6$, which are approximately level, are laid the small plates $k^{10}$ $k^{10}$, and through an opening in each at $k^{11}$ (see Fig. 13) is inserted a screw $k^{12}$, which enters a tapped hole in the face of the ring $k^2$, and when these screws $k^{12}$ are tightened they cause the plates $k^{10}$ to lock the rings $k^2$ and $k^6$ together, and the horns $k^7$ lock them to the shell $k$.

Referring to Fig. 2, the ball-bearings can be removed bodily, with the spindle and other attached parts, from the barrel A of the casing by unscrewing the joint between the end plate $f$ and that barrel.

In order to disconnect the spindle, the small screw $b^2$ must be partially withdrawn, so as to allow the stem or socket $d^5$ to be unscrewed from the outer end of the spindle $b$, which can then be freely withdrawn longitudinally from its connection with the ball-bearings.

Although we have shown the spindle mounted in the sleeve $e$ with its annulus $e'$, the said sleeve and its annulus might form a solid part of the spindle itself, in which case we make the fork $b^4$ at the inner end of the spindle a separate part, the portion $b^6$ being internally threaded, so as to screw onto the inner end of the spindle, which is provided with a correspondingly-made screw. This part $b^6$ beds firmly onto the disk $h$, which is thus held tight between the part $b^6$ and the shoulder on the spindle which corresponds with the inner end of the sleeve $e$, as shown in Fig. 2. This modified construction is shown by Fig. 25$^\times$. To remove this construction of spindle from the ball-bearings, it would be merely necessary to unscrew the fork $b^4$ and its socket $b^6$ from the spindle $b$, and the latter can then be freely withdrawn.

The shell $k$, with its contained disks and balls, can be separated from the other parts after the removal of the spindle, as already described, and after its disconnection from the end plate $f$ this set of parts as an entirety can be cleansed, regulated, and lubricated before being re placed without disturbing the relations of the antifriction parts at all.

The inner cylindrical case $A^3$ contains the wheelwork C of the registering mechanism; also, the pointers C', Figs. 2 and 3, for the dial-plates. The cylindrical cover A' is adapted to slide or telescope onto and off of the cylindrical case, and at its front is provided with a bezel or ring $A^4$, having a glazed pane $A^5$, the bezel or ring being adapted to swing laterally on the pivot-pin $a^{14}$, Fig. 3, so that the inboard end of the telescopic cylindrical cover A' may be opened and closed to cover and uncover or expose and conceal the dials and pointers. The back or movement plate $A^2$, secured to the cylindrical case $A^3$, is attached by screws $a^8$ to the cylindrical barrel A, and at its marginal or peripheral portion it is provided with a rabbet $a^9$, with which engages the inwardly turned or projecting annular flange $a^{10}$ of a locking-ring $a^{11}$. This ring is internally screw-threaded, as at $a^{12}$, to engage the external screw-thread on an outwardly-projecting bead or rim $a^{13}$, formed on the inner end of the telescopic cylindrical cover A', whereby the latter is firmly but detachably connected with the back or movement plate of the case containing the register mechanism. The telescopic cover can be conveniently and quickly unlocked and removed by simply unscrewing the locking-ring; but obviously the pointer and dial mechanism are readily accessible, while the telescoping cover is locked in place by shifting or swinging the bezel $A^4$ laterally on the pivot-pin $a^{14}$, thereby saving time and labor and avoiding danger of disarranging any part of the mechanism when it is merely desired to inspect the pointers and dials and the instrument is being handled by an inexperienced person.

With regard to the necklaces of balls $i'$ $i^2$ it is $i^2$ which bears the strain of the pull of the line acting on the spindle $b$, while the inner necklace $i'$, which acts as a means of regulating the amount of end shake, practically has no wear. The barrel or chamber A being practically liquid-tight, it may be filled with oil to above the level of the lowermost balls of the necklaces or thereabout.

The annular flange $e'$ is herein described and shown on the drawings as integral with the sleeve $e$ or with the spindle $b$; but it can readily be understood that it may be made in separable form, its function being to prevent sea-water from creeping into the ball-bearing chamber.

Figure 24:
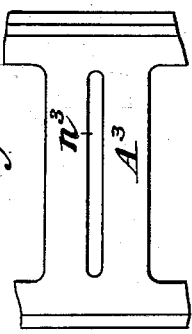

In the arrangement of fastening shown by Figs. 22, 23, and 24 provision is made for retaining the connection between the telescopic cylindrical cover A' and the cylindrical case $A^3$ of the wheelwork and restricting the distance it can be withdrawn when the spring-catches $n$ $n$ are removed from the holes $n'$, one of such holes being seen in Fig. 22. This sliding of the cover is controlled by the tails of the screws $n^2$, fixed in the cover A', traversing in the grooves $n^3$ formed in the case $A^3$ and shown in plan in Fig. 24. The spring-catches $n$ engaging the catch-holes $n'$ also constitute locking devices for locking the telescoping cylindrical cover A' in its closed position upon the cylindrical case $A^3$, containing the registering-wheelwork. This means of controlling the movement of the cover A' may be applied to the case shown in Fig. 1, if required.

The oiling of the balls $i'$ $i^2$ and their races can be effected through the holes $o$ $o$ at the top of the barrel A, and these holes are normally covered by a rotatable band $o'$, having holes $o^2$ $o^2$, which are brought coincident with the holes $o$ $o$ to open a passage and are turned around for closing the same.

Although we have only shown one necklace of balls and corresponding races located between opposite faces of the disks $h$ $h'$ $h^2$, it is within the scope of our invention to employ concentric rings of such balls, with corresponding concentric races, and we wish to include such a construction.

We claim—

1. A ship's-log apparatus having a pivotally-mounted barrel or chamber, a back plate secured thereto and constructed with a marginal rabbet, a registering-wheelwork case connected to the back plate, a cover telescoping on said case and provided at one end with an external screw-thread, and a locking-ring constructed with a flange to engage the rabbet of said back plate and an internal screw-thread to engage the external screw-thread of said telescoping cover, for locking the latter in its closed position on the case, substantially as described.

2. A ship's-log apparatus having a pivotally-mounted barrel or chamber, a case containing registering mechanism and carried by the barrel or chamber, a spindle coupled with the registering mechanism, a device engaged with one end of the spindle for the attachment of a rotator-line, an end plate closing the outer end of the barrel or chamber and constructed with an inwardly-projecting screw-threaded flange, and a reversible ball-bearing provided with an inclosing shell screw-threaded at its opposite extremities for the detachable engagement of either extremity to the screw-threaded flange of said end plate, substantially as described.

3. A ship's-log apparatus having a pivotally-mounted barrel, a case containing the registering mechanism and attached to the barrel, an end plate detachably secured to the outer end of the barrel and having a projecting flange, a ball-bearing provided with an inclosing shell secured to and supported concentric with the spindle by the said projecting flange on the end plate of the barrel, a dome secured to said end plate and through which the spindle extends, and an annulus arranged in the chamber of the dome between the latter and the end plate which closes the outer end of the barrel, substantially as described.

4. A ship's-log apparatus having a pivotally-mounted barrel, a case containing registering mechanism and attached to the barrel, an end plate secured to the barrel, a spindle coupled with the registering mechanism and extending through said end plate, a screw-socket screwed on the outer end of the spindle, a dome attached to the end plate, and a sleeve mounted on the spindle, tightly held by said screw-socket and having an annulus arranged in the chamber of said dome to intercept water entering the opening in the dome through which the spindle passes, substantially as described.

5. A ship's-log apparatus having a registering mechanism, a rotary spindle coupled with the latter, the eye $d$ attached to the outer end of the spindle and constructed with the opening $d^3$, the rectangular recess $d'$, and the curved sides $d^2$, and the rotator-line-attaching hook $c$ formed with the loop $c^5$, the rectangular recess $c'$, the body $c^3$ and hook-point $c^2$ both rectangular in cross-section and the incline $c^4$ between said rectangular body and hook-point, substantially as and for the purposes described.

6. A ship's-log apparatus having a registering mechanism, a rotary spindle coupled with the latter and formed with an externally-screw-threaded outer end $b'$ the eye $d$ having the rectangular recess $d'$, curved sides $d^2$ and the internally-screw-threaded socket $d^5$ engaging the threaded outer end of the spindle, and the rotator-line-attaching hook $c$ formed with the loop $c^5$, rectangular recess $c'$, body $c^3$ and hook-point $c^2$ both rectangular in cross-section, and the incline $c^4$ between said rectangular body and hook-point, substantially as and for the purposes described.

7. A ship's-log apparatus having a registering mechanism, a rotary spindle having a forked inner end and an externally-screw-threaded outer end, the eye $d$ having the rectangular recess $d'$ and the internally-screw-threaded socket $d^5$ engaging the screw-threaded outer end of the spindle, and the flattened hook $c$ having the body $c^3$ and hook-point $c^2$ rectangular in cross-section, substantially as and for the purposes described.

8. In a ship's-log apparatus, a pivotally-mounted barrel or chamber, a case containing registering mechanism, carried by the barrel or chamber, a spindle coupled with the registering mechanism, a device engaged with the end of the spindle for the attachment of the rotator-line, and an antifriction device for said spindle consisting of two necklaces of balls, a disk between them formed with raceways on its opposite sides, two disks each formed with a raceway on its inner face and each separately engaging the outer side of one of the said necklaces of balls, an inclosing shell for said balls and disks, a fixing and adjusting ring engageable with said shell, and a locking device between said locking-ring and inclosing shell.

9. In a ship's-log apparatus, a pivotally-mounted barrel or chamber, a case containing registering mechanism, carried by the barrel or chamber, a spindle coupled with the registering mechanism, a device engaged with the end of the spindle for the attachment of the rotator-line, and an antifriction device consisting of two necklaces of balls with their corresponding races, inclosed in an open-sided shell or cage having a fixing or adjusting ring engageable with said shell or cage, and a locking device for said adjusting-ring and inclosing shell.

10. In a ship's-log apparatus, a pivotally-mounted barrel or chamber, a case containing registering mechanism, carried by the barrel or chamber, a spindle coupled with the registering mechanism, a device engaged with the end of the spindle for the attachment of the rotator-line, and an antifriction device consisting of two necklaces of balls and their corresponding raceways, inclosed in an open framework, shell or cage having an adjusting-ring $k^2$, and a locking-ring $k^6$ having horns $k^7$ lying in recesses $k^8$ in said shell or cage.

11. In a ship's-log apparatus, a pivotally-mounted barrel or chamber, a case containing registering mechanism, carried by the barrel or chamber, a disconnectible "first" spindle coupled with the registering mechanism, a device engaged with the end of said spindle for the attachment of the rotator-line, and an antifriction device between said first spindle and said inclosing barrel, comprising two necklaces of balls, a disk between them formed with raceways on its opposite sides, two disks each formed with a raceway on its inner face engaging the outer sides of each of said necklaces of balls and inclosing shell for these balls and disks, a fixing and adjusting ring engageable with said shell, and a locking device between said adjusting-ring and inclosing shell.

12. A ship's-log apparatus having a pivotally-mounted barrel or chamber, a back plate secured thereto, a registering-wheelwork case connected to said back plate, said case having side openings for examination of and access to the registering-wheelwork, an outer case telescoping upon said wheelwork-case, so that by sliding said outer case, access to the wheelwork-case may be had through the openings in the inner case, and a locking device for locking said outer case in closed position upon the inner or wheelwork case.

13. In a ship's log, a register-wheelwork train, its supporting frame and casing, a removable cover to the dial and wheelwork, a lock means therefor, a disconnectible "first" spindle and inclosing barrel, and antifriction-bearing between said "first" spindle and such inclosing barrel, embodying two necklaces of balls, a disk between them formed with raceways on its opposite sides, a disk formed with a raceway on its inner face engaging the outer sides of each of said necklaces of balls, an inclosing shell for these balls and disks, a fixing and adjusting ring engageable with said shell, and a locking device between said adjusting-ring and inclosing shell, reversible means of connection between such shell and the casing thereof, and means for trapping and removing spray-water, substantially as set forth.

In testimony whereof we have hereunto set our hands in presence of two subscribing witnesses.

THOMAS FERDINAND WALKER.
THOMAS SYDNEY WALKER.

Witnesses:
ALBERT J. HITCHINSON,
JOHN H. BILSON.